United States Patent
Xu et al.

(10) Patent No.: US 11,780,940 B2
(45) Date of Patent: Oct. 10, 2023

(54) HYDRATE INHIBITORS

(71) Applicants: Kui Xu, Sugar Land, TX (US); Vaithilingam Panchalingam, Friendswood, TX (US); Wojciech J. Jakubowski, Sugar Land, TX (US); Szymon Jankowski, Houston, TX (US); Jonathan Raymond Stewart-Ayala, Houston, TX (US); Steven Jackson, Liverpool (GB); Christina Sanders, Lancashire (GB)

(72) Inventors: Kui Xu, Sugar Land, TX (US); Vaithilingam Panchalingam, Friendswood, TX (US); Wojciech J. Jakubowski, Sugar Land, TX (US); Szymon Jankowski, Houston, TX (US); Jonathan Raymond Stewart-Ayala, Houston, TX (US); Steven Jackson, Liverpool (GB); Christina Sanders, Lancashire (GB)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 447 days.

(21) Appl. No.: 16/915,214

(22) Filed: Jun. 29, 2020

(65) Prior Publication Data

US 2021/0403618 A1    Dec. 30, 2021

(51) Int. Cl.
| | | |
|---|---|---|
| C08F 20/54 | (2006.01) | |
| C08F 2/44 | (2006.01) | |
| C08F 26/10 | (2006.01) | |
| C08K 5/37 | (2006.01) | |
| C09K 8/52 | (2006.01) | |

(52) U.S. Cl.
CPC ............ C08F 20/54 (2013.01); C08F 2/44 (2013.01); C08F 26/10 (2013.01); C08K 5/37 (2013.01); C09K 8/52 (2013.01); C09K 2208/22 (2013.01)

(58) Field of Classification Search
CPC . C08F 20/54; C08F 2/44; C08F 26/10; C09K 2208/22; C09K 8/52; C08K 5/37
See application file for complete search history.

(56) References Cited

U.S. PATENT DOCUMENTS

| | | | |
|---|---|---|---|
| 5,399,642 A | 3/1995 | Emmons et al. | |
| 6,756,129 B1 * | 6/2004 | St. Arnauld | B41M 5/52 |
| | | | 525/218 |

FOREIGN PATENT DOCUMENTS

| | | | | |
|---|---|---|---|---|
| WO | 9604462 A1 | 2/1996 | | |
| WO | 2016052069 A1 | 4/2016 | | |
| WO | WO-2016052069 A1 * | 4/2016 | ............ | C07C 319/02 |
| WO | WO-2016053329 A1 * | 4/2016 | ............... | C09K 8/12 |
| WO | 2017192688 A1 | 11/2017 | | |

OTHER PUBLICATIONS

International Search Report for International Application No. PCT/US2021/038059, International Filing Date Jun. 18, 2021, dated Oct. 14, 2021, 7 pages.
Mohsenzade, H. et al., "Vinyl lactam-based copolymers and terpolymers as high cloud point kinetic hydrate inhibitors in methane-THF-water system", Journal of Molecular Liquids, 2020 [E-Pub.: Apr. 6, 2020], vol. 308, Article No. 113068, Internal pp. 1-13.
Written Opinion for International Application No. PCT/US2021/038059, International Filing Date Jun. 18, 2021, dated Oct. 14, 2021, 4 pages.
Zhang, Q. et al., "Study of the kinetic hydrate inhibitor performance of poly (N-vinylcaprolactam) and poly (N-sopropylmethacrylamide) with varying end caps", Energy & Fuels, 2018, vol. 32, No. 9, pp. 9211-9219 (Internal pp. A-I).

* cited by examiner

*Primary Examiner* — Robert D Harlan
(74) *Attorney, Agent, or Firm* — CANTOR COLBURN LLP

(57) ABSTRACT

An N-vinyl amide polymer is disclosed. The N-vinyl amide polymer is a reaction product of: a monomer component comprising an N-vinyl amide; and a chain transfer agent of the formula:

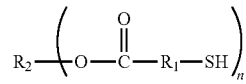

wherein each occurrence of $R_1$ is independently a $C_{1-20}$ alkylene, a $C_{1-20}$ heteroalkylene, a $C_{3-20}$ cycloalkylene, a $C_{3-20}$ heterocycloalkylene, a $C_{6-20}$ arylene, or a combination thereof, and $R_1$ is substituted or unsubstituted; $R_2$ is a divalent or multivalent organic group having 2 to 40 carbon atoms; and n is at least 2.

20 Claims, No Drawings

HYDRATE INHIBITORS

BACKGROUND

Hydrates can form when small molecules come contact with water in oil and gas exploration, production, transportation, or processing applications under various conditions. Hydrates usually exist in solid forms and can deposit and accumulate in various locations ranging from flowlines to valves to processing equipment causing a reduction or complete stoppage of production. Hydrates can also cause failure of critical safety valves.

One method to control hydrates related fluid processing problems is to apply hydrate inhibitors to water-containing fluids. Hydrate inhibitors are normally divided into two main groups, thermodynamic inhibitors and low dosage inhibitors. The low dosage inhibitors are divided into kinetic hydrate inhibitors and anti-agglomerates.

Various kinetic hydrate inhibitors are known in the art. While effective in inhibiting hydrate formation, many kinetic hydrate inhibitors have limited seawater biodegradability. There are numerous attempts reported in the literature to develop biodegradable kinetic hydrate inhibitors. However, these efforts usually lead to expensive and/or low-performance products, or field incompatibility. Accordingly, there is a continuing need in the art for alternative novel kinetic hydrate inhibitors. It would be a further advantage if the kinetic hydrate inhibitors have improved biodegradation and low toxicity in the marine environment.

BRIEF DESCRIPTION

An N-vinyl amide polymer is disclosed. The N-vinyl amide polymer is a reaction product of: a monomer component comprising an N-vinyl amide; and a chain transfer agent of Formula (I):

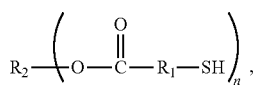

Formula (I)

wherein each occurrence of $R_1$ is independently a $C_{1-20}$ alkylene, a $C_{1-20}$ heteroalkylene, a $C_{3-20}$ cycloalkylene, a $C_{3-20}$ heterocycloalkylene, a $C_{6-20}$ arylene, or a combination thereof, and $R_1$ is substituted or unsubstituted; $R_2$ is a divalent or multivalent organic group having 2 to 40 carbon atoms; and n is at least 2.

A hydrate inhibitor composition comprising the above-described N-vinyl amide polymer is also disclosed.

A method of controlling hydrate formation in a fluid comprising water and a hydrate-forming guest molecule comprises contacting the fluid with an inhibitor composition comprising the above-described N-vinyl amide polymer.

DETAILED DESCRIPTION

The inventors hereof have discovered novel N-vinyl amide polymers that can be used as kinetic hydrate inhibitors. The N-vinyl amide polymers are reaction products of a monomer component comprising an N-vinyl amide and a chain transfer agent.

The chain transfer agent is of Formula (I):

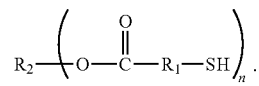

Formula (I)

In Formula (I), each occurrence of $R_1$ is independently a $C_{1-20}$ alkylene, a $C_{1-20}$ heteroalkylene, a $C_{3-20}$ cycloalkylene, a $C_{3-20}$ heterocycloalkylene, a $C_{6-20}$ arylene, or a combination thereof, and $R_1$ is substituted or unsubstituted; $R_2$ is a divalent or multivalent organic group having 2 to 40 carbon atoms; and n is at least 2, for example from 2 to 8, from 2 to 5, or from 2 to 4, such as 3 or 4.

Preferably, each occurrence of $R_1$ is independently a substituted or unsubstituted $C_{1-10}$ alkyl, a substituted or unsubstituted $C_{6-12}$ aryl, or a combination thereof. Examples of $R_1$ include $-CH_2-$, $-CH(CH_3)-$, $-CH(C_2H_5)-$, $-C(CH_3)_2-$, $-CH_2CH_2-$, $-CH(CH_3)CH_2-$, $-CH_2CH(NH_2)-$, $-CH_2CH(COOH)-$, $-CH_2CH_2CH_2-$, and $-C_6H_5CH_2-$.

$R_2$ is derived from a polyol or a reaction product of a polyol and a carboxylic acid. $R_2$ can be substituted or unsubstituted. Optionally $R_2$ is substituted with one or more hydroxyl groups. $R_2$ can also contain up to 10 ether bonds. $R_2$ can be a $C_{2-40}$ alkyl, a $C_{2-40}$ heteroalkyl, a $C_{3-40}$ cycloalkyl, a $C_{3-40}$ heterocycloalkyl, a $C_{6-40}$ aryl, or a combination thereof. Preferably $R_2$ is a $C_{2-30}$ alkyl, a $C_{3-30}$ cycloalkyl, a $C_{2-30}$ heteroalkyl, $C_{3-30}$ heterocycloalkyl, or a combination thereof. More preferably $R_2$ is a $C_{2-25}$ alkyl, a $C_{2-25}$ heteroalkyl, a $C_{5-6}$ cycloalkyl, a $C_{5-6}$ heterocycloalkyl, or a combination thereof.

The chain transfer agent can be derived from esterification of a polyol and a mercaptan-containing carboxylic acid. Optionally a carboxylic acid that does not have a mercaptan group can also be present during the reaction. $R_1$ in Formula (I) is derived from the mercaptan-containing carboxylic acid. $R_2$ in Formula (I) is derived from the polyol or a reaction of the polyol with the carboxylic acid without mercaptan groups.

As used herein, a "polyol" means a compound having two or more than two hydroxyl groups. Examples of the polyols include but not limited to ethylene glycol, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, 1,2-propanediol, 1,3-propanediol, 1,2-butanediol, 1,3-butanediol, 1,4-butanediol, 2,3-butanediol, 1,2,4-butanetriol, 1,1,1-tris(hydroxymethyl)ethane, 1,2,6-hexanetriol, diethylene glycol, triethylene glycol, dipropylene glycol, diglycerol, triglycerol, polyglycerol, pentaerythritol, dipentaerythritol, tripentaerythritol, 2,2-dibutyl-1,3-propanediol, or a combination comprising at least one of the foregoing.

Examples of the mercaptan-containing carboxylic acids include but not limited to thioglycolic acid, thiolactic acid, cysteine, mercaptosuccinic acid, 2-mercaptoisobutyric acid, 2-methyl-3-sulfanylpropanoic acid, 2-mercaptopropionic acid, 3-mercaptopropionic acid, 2-mercaptobutyric acid, 3-mercaptobutyric acid, 4-mercaptobutyric acid, 4-mercaptophenylacetic acid, or a combination comprising at least one of the foregoing.

Examples of the carboxylic acids that do not have mercaptan groups include but not limited to citric acid, succinic acid, malonic acid, tartaric acid, malic acid, nitrilotriacetic acid, phthalic acid, suberic acid, or a combination comprising at least one of the foregoing.

A molar ratio of the polyol to the mercaptan-containing carboxylic acid is about 1:1 to about 1:20, preferably about 1:2 to about 1:10, more preferably about 1:2 to about 1:6 depending on the number of the hydroxyl groups on the polyol. When a carboxylic acid that does not contain mercaptan groups is present, the molar ratio of the polyol to the carboxylic acid that does not contain mercaptan groups is about 20:1 to about 1:1, preferably about 10:1 to about 6:1 depending on the number of the hydroxyl groups on the polyol and the number of the acid groups on the carboxylic acid.

Reaction of polyols and mercaptan-containing carboxylic acids is generally conducted in the presence of solvents that can remove water by azeotropic distillation, preferably with a boiling point above about 50° C., specifically above about 80° C., for example toluene, xylene, anisole.

The chain transfer agent is generally prepared at a temperature of at least 50° C., specifically 500 to 200° C., more specifically 80° C. to 160° C., or 110° C. to 150° C. At temperatures below 50° C., reaction rates can be too slow for economical operation. Atmospheric or super-atmospheric pressures can be used, for example up to 5 atmospheres, to facilitate the use of high temperatures without causing solvent to be lost by evaporation.

The reaction mixture can be heated for about 30 minutes to about 10 hours or about 2 hours to about 8 hours. During the reaction, azeotropic distillation can be used to remove water (byproduct) from the reaction system. After the reaction is completed, the solvent is removed by vacuum evaporation. The chain transfer agent can be used in the polymerization without any purification.

As a specific example, the chain transfer agent is a reaction product of thioglycolic acid and sorbitol as illustrated in Scheme 1, wherein the molar ratio of thioglycolic acid relative to sorbitol is about 1:1 to about 6:1 or about 2:1 to about 5:1 or about 2:1 to about 4:1. As another specific example, the chain transfer agent is a reaction product of thioglycolic acid, sorbitol, and citric acid, wherein the molar ratio of thioglycolic acid, sorbitol, and citric acid is about 15:3:1 to about 1:3:1, preferably about 9:3:1 to about 3:3:1 as illustrated in Scheme 2.

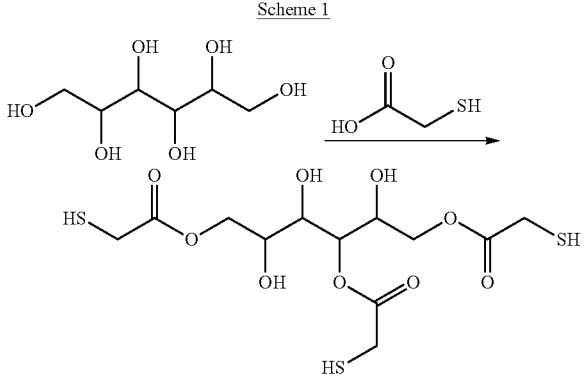

Scheme 1

Scheme 2

The chain transfer agent can react with a monomer component to make N-vinyl amide polymers. Optionally a crosslinking agent is also used in the polymerization reaction to make the N-vinyl amide polymers or in alternative ways such as post-polymerization reaction.

The monomer component includes an N-vinyl amide, and optionally at least one of an acrylate or an acrylamide. The molar percent of the N-vinyl amide in the monomer component is about 50 to 100 mol %, about 70 to 100 mol %, about 80 to 100 mol %, or about 90 mol % to 100 mol %, based on the total moles of the monomers in the monomer component. More than one N-vinyl amide monomer can be used.

N-vinyl amide can include a cyclic vinyl amide of Formula (II) or an acyclic vinyl amide of Formula (III):

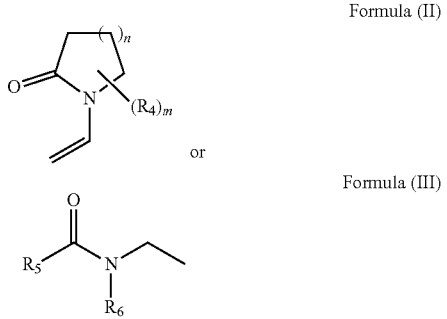

wherein each $R_4$ is independently a halogen atom or a $C_{1-10}$ alkyl, each of $R_5$ and $R_6$ is independently hydrogen or a $C_{1-10}$ alkyl, n is 1 to 5, and m is 2+n. Preferably, the N-vinyl amide is of Formula (II), wherein m is 0, and n is 1 to 3, preferably 1 to 2. More than one N-vinyl amide can be used. As a specific example, the monomer component includes vinyl-2-pyrrolidinone and N-vinylcaprolactam. The molar ratio of vinyl-2-pyrrolidinone relative to N-vinylcaprolactam is about 100:0 to about 0:100 or about 20:80 to about 80:20.

Examples of the cyclic vinyl amides include but not limited to N-vinyl-2-pyrrolidone, N-vinyl piperidone, N-vinyl-2-caprolactam, N-vinyl-3-methylpyrrolidone, N-vinyl 4-methyl pyrrolidone, N-vinyl-5-methylpyrrolidone, N-vinyl-3-ethyl pyrrolidone, N-vinyl-3-butyl pyrrolidone, N-vinyl-3,3-dimethylpyrrolidone, N-vinyl-4,5-dimethylpyrrolidone, N-vinyl-5,5-dimethylpyrrolidone, N-vinyl-3,3,5-trimethylpyrrolidone, N-vinyl-5-methyl-5-ethyl pyrrolidone, N-vinyl-3,4,5-trimethyl-3-ethyl pyrrolidone, N-vinyl 6-methyl-2-piperidone, N-vinyl-6-ethyl-2-piperidone, N-vinyl-3,5-dimethyl-2-piperidone, N-vinyl-4,4-dimethyl 2-piperidone, N-vinyl-6-propyl-2-piperidone, N-vinyl-3-methyl-2-caprolactam, N-vinyl-4-methyl-2-caprolactam, N-vinyl-7-methyl-2-caprolactam, N-vinyl-3,5-dimethyl-2-caprolactam, N-vinyl-3,7-dimethyl 2-caprolactam, N-vinyl-4,6-dimethyl-2-caprolactam, N-vinyl-3,5,7-trimethyl-2-caprolactam, N-vinyl-7-ethyl-2-caprolactam, N-vinyl-4-isopropyl-2-caprolactam, N-vinyl-5-isopropyl-2-caprolactam, N-vinyl-4-butyl-2-caprolactam, N-vinyl-5-butyl-2-caprolactam, N-vinyl-4-butyl-2-caprolactam, N-vinyl-5-tert-butyl-2-caprolactam, N-vinyl-2-methyl 4-isopropyl-2-caprolactam, N-vinyl-5-isopropyl-7-methyl 2-caprolactam, or a combination comprising at least one of the foregoing.

Examples of the acyclic vinyl amides include but not limited to N-vinyl acetamide, N-vinyl formamide, N-vinyl-N-methyl acetamide, N-vinyl-N,N-propyl propionamide, or a combination comprising at least one of the foregoing.

The acrylate can be of Formula (IV):

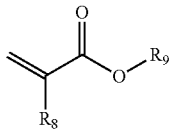

wherein $R_8$ is hydrogen or methyl; and $R_9$ is hydrogen, a $C_{1-10}$ alkyl, preferably $C_{2-8}$ alkyl, or a $C_{5-12}$ cycloalkyl, or a combination thereof.

Examples of the acrylates include but not limited to ethyl acrylate, n-propyl acrylate, isopropyl acrylate, n-butyl acrylate, t-butyl acrylate, isobutyl acrylate, n-amyl acrylate, iso-amyl acrylate, n-hexyl acrylate, isohexyl acrylate, n-heptyl acrylate, isoheptyl acrylate, n-octyl acrylate, isooctyl acrylate, 2-ethylhexyl acrylate, cyclopentyl acrylate, cyclohexyl acrylate, cycloheptyl acrylate, acrylic acid, methacrylic acid, n-propyl methacrylate, isopropyl methacrylate, n-butyl methacrylate, t-butyl methacrylate, isobutyl methacrylate, n-amyl methacrylate, iso-amyl methacrylate, n-hexyl methacrylate, isohexyl methacrylate, n-heptyl methacrylate, isoheptyl methacrylate, n-octyl methacrylate, isooctyl methacrylate, 2-ethylhexyl methacrylate, cyclopentyl methacrylate, cyclohexyl methacrylate, cycloheptyl methacrylate, or a combination comprising at least one of the foregoing. Preferably the acrylate is butyl acrylate. As a specific example, the monomer component includes vinyl-2-pyrrolidinone and butyl acrylate, wherein the molar ratio of vinyl-2-pyrrolidinone relative to butyl acrylate is about 100:0 to about 80:20 or about 96:4 to about 85:15.

Examples of the acrylamides include but not limited to N-ethyl acrylamide, N-propyl acrylamide, N-isopropyl acrylamide, N-butyl acrylamide, N-t-butyl acrylamide, N-isobutyl acrylamide, N-amyl acrylamide, N-isoamyl acrylamide, N-hexyl acrylamide, N-isohexyl acrylamide, N-heptyl acrylamide, N-isoheptyl acrylamide, N-octyl acrylamide, N-isooctyl acrylamide, N-cyclopentyl acrylamide, N-cyclohexyl acrylamide, N-cycloheptyl acrylamide, N,N-dimethyl acrylamide, N,N-diethyl acrylamide, N,N-dipropyl acrylamide, N-ethyl methacrylamide, N-propyl methacrylamide, N-isopropyl methacrylamide, N-butyl methacrylamide, N-t-butyl methacrylamide, N-isobutyl methacrylamide, N-amyl methacrylamide, N-isoamyl methacrylamide, N-hexyl methacrylamide, N-isohexyl methacrylamide, N-heptyl methacrylamide, N-isoheptyl methacrylamide, N-octyl methacrylamide, N-isooctyl methacrylamide, N-cyclopentyl methacrylamide, N-cyclohexyl methacrylamide, N-cycloheptyl methacrylamide, N,N-dimethyl methacrylamide, N,N-diethyl methacrylamide, N,N-dipropyl methacrylamide, or a combination comprising at least one of the foregoing.

Preferably, a crosslinking agent is used in the polymerization reaction to make the N-vinyl amide polymers. Examples of the crosslinking agents include but not limited to glycerol dimethacrylate, ethylene glycol dimethacrylate, di(ethylene glycol) dimethacrylate, triethylene glycol dimethacrylate, tetraethylene glycol dimethacrylate, poly(ethylene glycol) dimethacrylate, 1,3-butanediol dimethacrylate, 1,4-butanediol dimethacrylate, glycerol 1,3-diglycerolate diacrylate, ethylene glycol diacrylate, di(ethylene glycol) diacrylate, tri(ethyleneglycol) diacrylate, tetra(ethylene glycol) diacrylate, poly(ethylene glycol) diacrylate, 1,4-butanediol diacrylate, or a combination comprising at least one of the foregoing.

Polymerization by reaction of the monomer component with the chain transfer agent can be conducted in the presence a free radical initiator. A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy. Any known free radical initiators can be used. Examples of the free radical initiators include but not limited to hydroperoxides, azo-bis(alkyl- or cycloalkylnitriles), persulfates, percarbonates or mixtures thereof. Examples specifically include but not limited to benzoylperoxide, tert.-butyl peroxide, di-tert.-butyl-diperoxyphthalate, tert.-butyl hydroperoxide, azobisisobutyronitrile (AIBN), 1,1-azodiisobutyramidine, 1,1'-azo-bis (1-cyclohexanecarbonitrile), 2,2'-azobis(2,4-dimethyl-valeronitrile), benzoin methyl ether, diethoxyacetophenone, a benzoylphosphine oxide, 1-hydroxycyclohexyl phenyl ketone, or a combination comprising at least one of the foregoing. As a specific example, the free radical initiator is azobisisobutyronitrile.

Polymerization is generally conducted in the presence of a relatively polar solvent, for example alcohols (e.g., 1-butanol, 2-butanol, ethanol, ethylene glycol, methanol, 1-propanol, 2-propanol, and propylene glycol), and glycol ethers (e.g., 2-methoxyethanol, 2-butoxyethanol, 2-isopropoxyethanol). A combination comprising at least one of the foregoing solvents can be used.

Polymerization can be conducted at a temperature of at least 50° C., specifically 500 to 150° C., more specifically 70 to 100° C. At temperatures below 50° C., reaction rates can be too slow for economical operation. Atmospheric or super-atmospheric pressures can be used, for example up to 5 atmospheres, to facilitate the use of high temperatures without causing solvent to be lost by evaporation.

A specific example of the N-vinyl amide polymers as disclosed herein is derived from polymerization of 1-vinyl-2-pyrrolidinone, glycerol dimethacrylate, and a chain transfer agent derived from thioglycolic acid and sorbitol as illustrated in Scheme 3.

Scheme 3

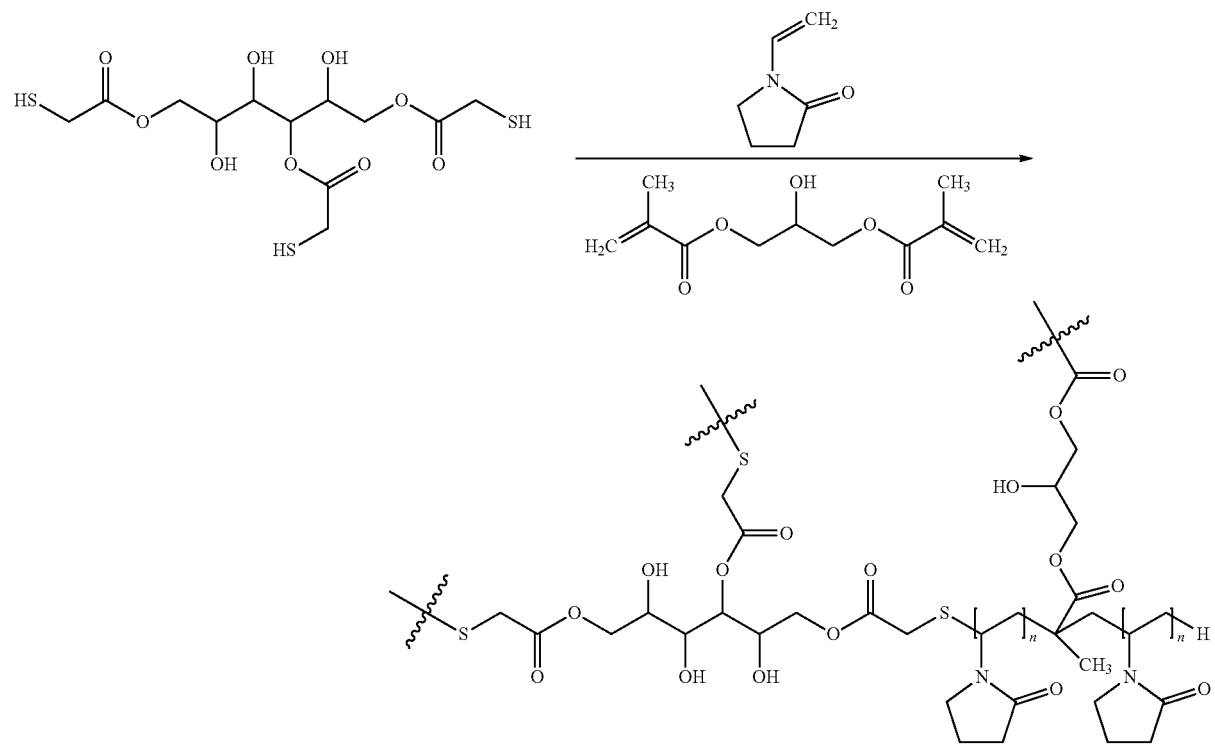

The N-vinyl amide polymers can have a weight average molecular weight of about 800 Daltons to about 50,000 Daltons, preferably about 1000 Daltons to about 5,000 Daltons, as determined by matrix assisted laser desorption/ionization time of flight (MALDI-TOF) mass spectrometry.

The N-vinyl amide polymers can have good seawater biodegradation. In an embodiment, the N-vinyl amide polymers have biodegradation in seawater after 28 days of greater than 15% or greater than 20% as determined by OECD 306. As used herein, OECD 306 refers to "The Organization for Economic Co-operation and Development test No. 306."

The N-vinyl amide polymers can have low toxicity. In an embodiment, the N-vinyl amide polymers have a toxicity LC50/EC50 of greater than 10 mg/L, tested against saltwater algae by measuring LC50 and EC50 in 72 hours in accordance with OECD 306. As used herein, the median effective concentration (EC50) is the concentration of a substance in an environmental medium expected to produce a certain effect in 50% of test organisms in a given population under a defined set of conditions. The Lethal Concentration 50 (LC50) is the concentration of a substance in water causing a death (50% of the tested population) to aquatic life.

The N-vinyl amide polymers as described herein are excellent hydrate inhibitors, preferably kinetic hydrate inhibitors. The N-vinyl amide polymers can be used together with a delivery solvent to form hydrate inhibitor compositions. The delivery solvent includes water and liquid oxygenated materials such as methanol, ethanol, propanol, butanol, glycols like ethylene glycol; 1,2-propylene glycol; 1,3-propylene glycol; and glycerin, esters and ethers of glycols such as diethylene glycol monoethyl ether; ethoxylated propylene glycols; and ethylene glycol monobutyl ether, 2-ethoxyethanol, 2-propoxyethanol, 2-isopropoxyethanol, 2-butoxyethanol, 2-isobutoxyethanol, 2-methoxyethanol, ketones such as cyclohexanone and diisobutylketone, or a combination comprising at least one of the foregoing. The delivery solvent is present in the hydrate inhibiting compositions in the range of from about 50 wt % to about 99 wt %, preferably from about 65 wt % to about 99 wt %, based on the total weight of the hydrate inhibitor compositions. The N-vinyl amide polymers can be present in an amount of about 1 wt % to about 50 wt %, preferably about 1 wt % to about 35 wt %, based on the total weight of the hydrate inhibitor compositions.

The N-vinyl amide polymers can be used alone or in combination with other additives. In an embodiment, the hydrate inhibitor compositions may also include biocides, corrosion inhibitors, scale inhibitors, paraffin inhibitors, sulfide scavengers, emulsifiers, de-emulsifiers, water-soluble salts having a multivalent cation, defoamers, lubricants, rheology modifiers, shale swelling inhibitor, or a combination comprising at least one of the foregoing. These additives and their addition levels are known to one skilled in the art of oilfield applications, especially hydrate formulations.

The hydrate inhibitor compositions can be formulated in various forms including, solutions, dispersions, emulsions, and the like. Depending on the form of the hydrate compositions, additives such as water, surfactants, dispersants, emulsifiers, or a combination comprising at least one of the foregoing may be present.

The N-vinyl amide polymers can be used to control hydrate formation in a fluid comprising water and a hydrate-forming guest molecule. The method comprises contacting the fluid with an inhibitor composition comprising the N-vinyl amide polymers.

The hydrate-forming guest molecule comprises methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon, or a combination comprising at least one of the foregoing.

The amount of the N-vinyl amide polymers used to treat the fluid that contains water and a hydrate-forming guest molecule can vary depending on the specific N-vinyl amide polymers used, the specific chemistry of the fluid to be treated, as well as the conditions such as the pressure and temperature that the N-vinyl amide polymers are exposed to during production, refining, and storage. In an embodiment, about 0.1 to about 10 wt % or about 0.1 to about 5 wt %, of the N-vinyl amide polymers are used to treat the fluid containing water and the hydrate-forming guest molecule, based on the total weight of the fluid.

The biodegradable polymers having hydrate inhibiting properties are further illustrated by the following non-limiting examples.

Examples

The materials used in the Examples are described in Table 1.

TABLE 1

| Component | Chemical Description |
|---|---|
| VP | 1-Vinyl-2-pyrrolidinone |
| VCAP | N-Vinylcaprolactam |
| BA | Butyl acrylate |
| GDM | Glycerol dimethacrylate |
| SO | Sorbitol |
| TGA | Thioglycolic acid |
| CA | Citric Acid |
| AIBN | Azobisisobutyronitrile |
| BOE | 2-Butoxy ethanol |
| EG | Ethylene glycol |
| CTA-1 | Chain transfer agent derived from sorbitol and TGA |
| CTA-2 | Chain transfer agent derived from citric acid, sorbitol, and TGA |

Preparation of Chain Transfer Agent

CTA-1: Sorbitol (36.4 grams), thioglycolic acid (46.0 grams), hydrochloric acid (2 mL, 37% in water by weight) and toluene (50 mL) were introduced into a three neck round bottom flask equipped with a water separator. The reaction mixture was stirred at 110-120° C. under a nitrogen flow, until no further water passed over through the water separator. Toluene was then removed by distillation, and the product mixture was dried by heating at 120° C. for 4 hours under vacuum. The resulting product (CTA-1) was used for polymerization reaction without any further purification.

CTA-2: Sorbitol (27.3 grams), thioglycolic acid (18.4 grams), citric acid (9.6 grams), hydrochloric acid (2 mL, 37% in water by weight) and toluene (40 mL) were introduced into a three neck round bottom flask equipped with a water separator. The reaction mixture was stirred at 110-120° C. under a nitrogen flow, until no further water passed over through the water separator. Toluene was then removed by distillation, and the product mixture was dried by heating at 120° C. for 4 hours under vacuum. The resulting product (CTA-2) was used for polymerization reaction without any further purification.

Preparation of N-Vinyl Amide Polymers

Various samples have been prepared by changing monomer/chain transfer agent/crosslinker selections and their ratios in accordance with Table 2.

TABLE 2

| Sample # | CTA (SO/TGA/CA molar ratio) | Crosslinker | Monomer ratio (mol) | | |
|---|---|---|---|---|---|
| | | | VCAP | VP | BA |
| 1 | 1:4:0 | — | 55% | 45% | |
| 2 | 1:3:0 | — | 50% | 50% | |
| 3 | 1:2.5:0 | — | | 92% | 8% |
| 4 | 1:2.5:0 | GDM | 50% | 50% | |
| 5 | 1:2.5:0 | GDM | | 92% | 8% |
| 6 | 1:2.5:0 | GDM | | 100% | |
| 7 | 3:4:1 | GDM | | 92% | 8% |
| 8 | 1:2.5:0 | GDM | | 92% | 8%* |
| 9 | 3:4:1 | GDM | 50% | 50% | |

TABLE 2-continued

| Sample # | CTA (SO/TGA/CA molar ratio) | Crosslinker | Monomer ratio (mol) | | |
|---|---|---|---|---|---|
| | | | VCAP | VP | BA |
| 10 | 1:2.5:0 | GDM | 100% | | |
| 11 | 3:4:1 | GDM | 100% | | |
| 12 | 1.2.5:0 | GDM | | 88% | 10%** |

*Butyl methacrylate used instead of butyl acrylate
**2% Acrylic acid added

Representative preparation procedures are shown below.

Sample 4: A chain transfer agent (CTA-1, 6.6 grams), N-vinylpyrrolidone (13.2 grams), N-vinylcaprolactam (16.7 grams), glycerol dimethacrylate (3.4 grams), 2-butoxyethanol (40 grams), and azobisisobutyronitrile (0.1 gram) were added into a three neck round bottom flask. The flask was purged with nitrogen for 20 minute, and then the reaction mixture was heated at 85° C. for 3 hours. Additional azobisisobutyronitrile (0.11 gram) was added to the reaction mixture. Then the reaction mixture was kept at 85° C. for additional 3 hours before cooling down to room temperature. The polymer product was collected and used for testing without further purification.

Sample 5: A chain transfer agent (CTA-1, 6.6 grams), N-vinylpyrrolidone (27.4 grams), butyl acrylate (2.6 grams), glycerol dimethacrylate (3.4 grams), 2-butoxyethanol (40 grams), and azobisisobutyronitrile (0.1 gram) were added into a three neck round bottom flask. The flask was purged with nitrogen for 20 minute, and then the reaction mixture was heated at 85° C. for 3 hours. Additional azobisisobutyronitrile (0.1 gram) was added to the reaction mixture. Then the reaction mixture was kept at 85° C. for additional 3 hours before cooling down to room temperature. The polymer product was collected and used for testing without further purification.

Sample 7A: A chain transfer agent (6.6 grams, CTA-2), N-vinylpyrrolidone (17.8 grams), butyl acrylate (1.7 grams), glycerol dimethacrylate (0.7 gram), 2-butoxyethanol (27 grams), and azobisisobutyronitrile (0.1 gram) were added into a three neck round bottom flask. The flask was purged with nitrogen for 20 minutes, and then the reaction mixture was heated at 85° C. for 3 hours. Additional azobisisobutyronitrile (0.1 gram) was added to the reaction mixture. Then the reaction mixture was kept at 85° C. for additional 3 hours before cooling down to room temperature. The polymer product was collected and used for testing without further purification.

Sample 7B: A chain transfer agent (10 grams, CTA-2), N-vinylpyrrolidone (18 grams), butyl acrylate (1.8 grams), glycerol dimethacrylate (0.7 gram), 2-butoxyethanol (15 grams), ethylene glycol (15 gram), and azobisisobutyronitrile (0.1 gram) were added into a three neck round bottom flask. The flask was purged with nitrogen for 20 minutes, and then the reaction mixture was heated at 85° C. for 3 hours. Additional azobisisobutyronitrile (0.1 gram) was added to the reaction mixture. Then the reaction mixture was kept at 85° C. for additional 3 hours before cooling down to room temperature. The polymer product was collected and used for testing without further purification.

Sample 9: A chain transfer agent (CTA-2, 6.6 grams), N-vinylpyrrolidone (8.6 grams), N-vinylcaprolactam (10.9 grams), glycerol dimethacrylate (0.7 gram), 2-butoxyethanol (27 grams), and azobisisobutyronitrile (0.1 gram) were added into a three neck round bottom flask. The flask was purged with nitrogen for 20 minutes, and then the reaction mixture was heated at 85° C. for 3 hours. Additional azobisisobutyronitrile (0.1 gram) was added to the reaction mixture. Then the reaction mixture was kept at 85° C. for additional 3 hours before cooling down to room temperature. The polymer product was collected and used for testing without further purification.

Testing Procedures

Cloud point measurement was carried out by using the following procedure. A solution of 1 wt % of an N-vinyl amide polymer in water or brine was heated at a rate of about 2° C./min with constant stirring. The cloud point temperature was determined by the first sign of haze in the solution.

Cloud point screening tests were performed by heating the tested samples containing 1 wt. % of N-vinyl amide polymers in water or brine (3.6% NaCl) at 60° C. for 1 hour, and observing the heated samples. The results were recorded as "No Precipitation," "Precipitation," or "Clear," where "No precipitation" means that no precipitation but haziness is observed, "Precipitation" means that solid precipitates are observed, and the precipitates could not be re-dissolved or re-suspended back into the solution by shacking, and "Clear" means that transparent solution with no or very little precipitation is observed.

Hot-injection screening test determines how stable the polymer is at injection point temperature (whatever the injection temperature is at the specified gas field). A glass bottle containing the water/condensate mixture was heated to 90° C. using a temperature controlled stirrer hotplate. Once at 90° C., polymer solution was injected at the appropriate dose based on the water cut. The solution was left at 90° C. for 1 hour then allowed to cool back below 30° C. Observations on solid precipitation were taken throughout the test.

KHI performance of prepared polymers was evaluated by running constant cooling experiments in a rocker rig that had multiple sapphire rocking cells, where each rocking cell contained a steel ball for agitating the test samples. Experiments were performed by using green canyon gas at an initial gas pressure of 950 psi and an initial temperature of 70° F. The green canyon gas contained 87.6 vol % methane, 7.6 vol % ethane, 3.2 vol % propane, 0.5 vol % n-butane, 0.5 vol % isobutene, 0.2 vol % pentane, 0.2 vol % isopentane, and 0.2 vol % nitrogen. KHI performance was tested under two conditions. Condition A: testing was conducted at 45° F. and 878 psi, and the subcooling temperature was 16° F. (i.e. 8.9° C.). Condition B: testing was conducted at 40° F. and 878 psi, and the subcooling temperature was 21.2° F. (i.e. 11.8° C.).

The seawater biodegradability of N-vinyl amide polymers was evaluated following the OECE 306 guidelines, and the toxicity was tested against saltwater algae by measuring EC50 in 72 hours following the OECE 306 guidelines.

Cloud Point and Hot-Injection Screen Testing Results

The cloud point and hot-injection test results are summarized in Table 3.

TABLE 3

| | Cloud point @ 60° C. | | Hot injection @ |
|---|---|---|---|
| Sample # | Water | Brine | 90° C. |
| 1 | Precipitation | Precipitation | Precipitation |
| 2 | Clear | Clear | Precipitation |
| 3 | No precipitation | No precipitation | No precipitation |
| 4 | Clear | Precipitation | Precipitation |
| 5 | No precipitation | No precipitation | No precipitation |
| 6 | Clear | Clear | No precipitation |

TABLE 3-continued

| | Cloud point @ 60° C. | | Hot injection @ |
| Sample # | Water | Brine | 90° C. |
| --- | --- | --- | --- |
| 7A/7B | No precipitation | No precipitation | No precipitation |
| 8 | No precipitation | No precipitation | No precipitation |
| 9 | Clear | Precipitation | Precipitation |
| 10 | Not Soluble | Not Soluble | Not Soluble |
| 11 | Not Soluble | Not Soluble | Not Soluble |
| 12 | No precipitation | No precipitation | No precipitation |

The results show that samples 10 and 11, which are N-vinyl amide polymers made from VCAP monomer only, are not soluble or dispersible in water at 60° C.

N-vinyl amide polymers made from 50 mol % VCAP and 50 mol % VP, namely, samples 2, 4, and 9, have great solubility in water, and their cloud point temperatures are all above 60° C. when dissolved in de-ionized water at 1 wt. %. In 3.6% NaCl brine, samples 4 and 9 precipitate out at 60° C. as their cloud point temperatures are lower than 60° C. The N-vinyl amide polymers made from VCAP/VP (50 mol %/50 mol %) precipitate out from their brine solutions during the hot-injection screening test at 90° C.

The N-vinyl amide polymers made from VP/BA (92 mol %/8 mol %), namely, samples 3, 5, and 7 form hazy but homogeneous solutions in de-ionized water as well as in 3.6% NaCl brine. The hazy appearance of these solutions remain the same over a broad range of temperatures, e.g. from −4 to 90° C.

KHI Performance

The test results under condition A are listed in Table 4. N-vinyl amide polymer samples of the disclosure contained 15 wt % polymer, 15 wt % butyl glycol ether, and 70 wt % glycol, and the samples were tested at a dosage of 0.225 wt % based on polymer weight. A commercial product VCAP copolymer was tested at a dosage of 0.135 wt % based on polymer weight as a reference for comparison.

TABLE 4

| Sample # | Rocking celling @ 45° C. |
| --- | --- |
| 1 | 1000 mins* |
| 2 | 720 minutes |
| 3 | 1240 minutes |
| 4 | 2640 minutes |
| 5 | 2760 minutes |
| 6 | 1020 minutes |
| 7A | 1740 minutes |
| 8 | — |
| 9 | 960 minutes |
| 10 | — |
| 11 | — |
| 12 | — |
| VCAP copolymer | 1200 minutes |

*Ball stopped rolling completely at 2460 min

The results in Table 4 indicate that polymers made from CTA-1 generally perform better than polymers made from CTA-2. The hydrate formation was delayed for more than 1440 minutes (i.e. 24 hours) after treated with samples 4, 5, and 7, in comparison with 1200 minutes after treated with reference a VCAP copolymer. Samples 6 and 9 also show good hydration inhibiting performance. These results indicate that the N-vinyl amide polymers according to the disclosure can be used for controlling hydrate formation.

The KHI performance test results under condition B are shown in Table 5. A hyperbranched poly(ester-amide) (HPEA) polymer, was tested as a reference under the same testing conditions as N-vinyl amide polymers. All samples were dosed at 0.15 wt % (weight percentage of polymer).

TABLE 5

| Sample # | Hydrate Time (min) | Delay Time (min) | Comment |
| --- | --- | --- | --- |
| 4 | 269 | 190 | Slow hydrate formation for ~36 min |
| 5 | 471 | 392 | Slow hydrate formation for ~62 min |
| 3 | 291 | 212 | Slow hydrate formation for ~32 min |
| 7A | 333 | 254 | Slow hydrate formation for ~52 min |
| 8 | 111 | 32 | No slowed hydrate formation |
| 12 | 535 | 456 | Slow hydrate formation for ~49 min |
| HPEA | 216 | 137 | Slow hydrate formation for ~7 min |
| Blank | 79 | 0 | |

The results from Table 5 confirm the promise of using N-vinyl amide polymers for hydrate inhibition applications. Particularly, samples 4-6, 7, and 12 show longer delayed time for hydrate formation than reference HPEA.

The N-vinyl amide polymers also have slowed hydrate formation, which is denoted by the time taken from start of hydrate forming to steel ball stopping rolling. Without wishing to be bound by theory, it is believed that the slowed hydrate formation may be indicative that these N-vinyl amide polymers have anti-agglomeration effect as well.

Seawater Biodegradation and Toxicity Test Results

The seawater biodegradability and toxicity of N-vinyl amide polymers were evaluated. The results are summarized in Table 6.

TABLE 6

| | Seawater Biodegradation | | | Toxicity to Saltwater |
| Sample # | Day 7 | Day 21 | Day 28 | Algae, 72 hours EC 50 |
| --- | --- | --- | --- | --- |
| 4 | 15% | 20% | — | >500 mg/L |
| 5 | 12% | 16% | 16% | >500 mg/L |
| 7A | 16% | 20% | 20% | >100 mg/L |
| 7B | 16% | 28% | 30% | >100 mg/L |
| 9 | 15% | 21% | 21% | >500 mg/L |

As seen in Table 6, samples 4, 7, and 9 reach 20% biodegradability in 21 days and exhibit EC50 exceeding 100 mg/L. The results indicate that N-vinyl amide polymers meet CEFAS (Centre for Environment Fisheries and Aquaculture Science) criteria.

Set forth are various embodiments of the disclosure.

Embodiment 1. An N-vinyl amide polymer which is a reaction product of: a monomer component comprising an N-vinyl amide; and a chain transfer agent of Formula (I):

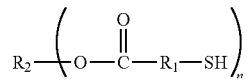

Formula (I)

wherein each occurrence of $R_1$ is independently a $C_{1-20}$ alkylene, a $C_{1-20}$ heteroalkylene, a $C_{3-20}$ cycloalkylene, a $C_{3-20}$ heterocycloalkylene, a $C_{6-20}$ arylene, or a combination thereof, and $R_1$ is substituted or unsubstituted; $R_2$ is a divalent or multivalent organic group having 2 to 40 carbon atoms; and n is at least 2.

Embodiment 2. The N-vinyl amide polymer as in any prior embodiment, wherein each occurrence of $R_1$ is independently a $C_{1-10}$ alkylene, a $C_{6-12}$ arylene, or a combination thereof.

Embodiment 3. The N-vinyl amide polymer as in any prior embodiment, wherein $R_2$ is a substituted or unsubstituted $C_{2-30}$ alkyl, $C_{3-30}$ cycloalkyl, $C_{2-30}$ heteroalkyl, $C_{3-30}$ heterocycloalkyl, or a combination comprising at least one of the foregoing.

Embodiment 4. The N-vinyl amide polymer as in any prior embodiment, wherein $R_2$ has one or more hydroxyl substituents.

Embodiment 5. The N-vinyl amide polymer as in any prior embodiment, wherein the chain transfer agent is a reaction product of a polyol and a mercaptan-containing carboxylic acid.

Embodiment 6. The N-vinyl amide polymer as in any prior embodiment, wherein the polyol and the mercaptan-containing carboxylic acid has a molar ratio of about 1:20 to about 1:1.

Embodiment 7. The N-vinyl amide polymer as in any prior embodiment, wherein the polyol comprises ethylene glycol, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, 1,2-propanediol, 1,3-propanediol, 1,2-butanediol, 1,3-butanediol, 1,4-butanediol, 2,3-butanediol, 1,2,4-butanetriol, 1,1,1-tris(hydroxymethyl)ethane, 1,2,6-hexanetriol, diethylene glycol, triethylene glycol, dipropylene glycol, diglycerol, triglycerol, polyglycerol, pentaerythritol, dipentaerythritol, tripentaerythritol, 2,2-dibutyl-1,3-propanediol, or a combination comprising at least one of the foregoing; and the mercaptan-containing carboxylic acid comprises thioglycolic acid, thiolactic acid, cysteine, mercaptosuccinic acid, 2-mercaptoisobutyric acid, 2-methyl-3-sulfanylpropanoic acid, 2-mercaptopropionic acid, 3-mercaptopropionic acid, 2-mercaptobutyric acid, 3-mercaptobutyric acid, 4-mercaptobutyric acid, 4-mercaptophenylacetic acid, or a combination comprising at least one of the foregoing.

Embodiment 8. The N-vinyl amide polymer as in any prior embodiment, wherein the chain transfer agent is a reaction product of a polyol, a mercaptan-containing carboxylic acid, and a carboxylic acid different from the mercaptan-containing carboxylic acid.

Embodiment 9. The N-vinyl amide polymer as in any prior embodiment, wherein the chain transfer agent is a reaction product of sorbitol and thioglycolic acid or a reaction product of sorbitol, thioglycolic acid, and citric acid, or a combination thereof.

Embodiment 10. The N-vinyl amide polymer as in any prior embodiment, wherein the N-vinyl amide is of Formula (II) or Formula (III)

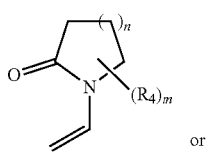

Formula (II)

or

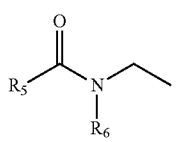

Formula (III)

wherein each $R_4$ is independently a halogen atom or a $C_{1-10}$ alkyl, each of $R_5$ and $R_6$ is independently hydrogen or a $C_{1-10}$ alkyl, n is 1 to 5, and m is 2+n.

Embodiment 11. The N-vinyl amide polymer as in any prior embodiment, wherein the N-vinyl amide is of Formula (II), m is 0, and n is 1 to 2.

Embodiment 12. The N-vinyl amide polymer as in any prior embodiment, wherein the monomer component further comprises at least one of an acrylate or an acrylamide.

Embodiment 13. The N-vinyl amide polymer as in any prior embodiment, wherein the N-vinyl amide polymer is a reaction product of the monomer component, the chain transfer agent, and a crosslinking agent.

Embodiment 14. The N-vinyl amide polymer as in any prior embodiment, wherein the crosslinking agent comprises glycerol dimethacrylate, ethylene glycol dimethacrylate, di(ethylene glycol) dimethacrylate, triethylene glycol dimethacrylate, tetraethylene glycol dimethacrylate, poly(ethylene glycol) dimethacrylate, 1,3-butanediol dimethacrylate, 1,4-butanediol dimethacrylate, glycerol 1,3-diglycerolate diacrylate, ethylene glycol diacrylate, di(ethylene glycol) diacrylate, tri(ethyleneglycol) diacrylate, tetra(ethylene glycol) diacrylate, poly(ethylene glycol) diacrylate, or 1,4-butanediol diacrylate, or a combination comprising at least one of the foregoing.

Embodiment 15. The N-vinyl amide polymer as in any prior embodiment, wherein the monomer component comprises 1-vinyl-2-pyrrolidinone and at least one of N-vinylcaprolactam and butyl acrylate.

Embodiment 16. A hydrate inhibitor composition comprising the N-vinyl amide polymer as in any prior embodiment.

Embodiment 17. The hydrate inhibitor composition as in any prior embodiment, further comprising a solvent.

Embodiment 18. The hydrate inhibitor composition as in any prior embodiment, wherein the solvent comprises methanol, ethanol, propanol, butanol, ethylene glycol, 1,2-propylene glycol, 1,3-propylene glycol, glycerin, diethylene glycol monoethyl ether, ethoxylated propylene glycols, ethylene glycol monobutyl ether, 2-ethoxyethanol, 2-propoxyethanol, 2-isopropoxyethanol, 2-butoxyethanol, 2-isobutoxyethanol, 2-methoxyethanol, a ketone, or a combination comprising at least one of the foregoing.

Embodiment 19. The hydrate inhibitor composition as in any prior embodiment, wherein the N-vinyl amide polymer is present in an amount of about 5 to about 50 wt % based on the total weight of the hydrate inhibitor composition.

Embodiment 20. A method of controlling hydrate formation in a fluid comprising water and a hydrate-forming guest molecule, the method comprising contacting the fluid with an inhibitor composition comprising the polymer as in any prior embodiment.

Embodiment 21. The method of claim as in any prior embodiment, wherein the hydrate-forming guest molecule comprises methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon, or a combination comprising at least one of the foregoing.

Embodiment 22. A chain transfer agent of Formula (I):

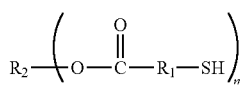

Formula (I)

wherein each occurrence of $R_1$ is independently a $C_{1-20}$ alkylene, a $C_{1-20}$ heteroalkylene, a $C_{3-20}$ cycloalkylene, a $C_{3-20}$ heterocycloalkylene, a $C_{6-20}$ arylene, or a combination thereof, and $R_1$ is substituted or unsubstituted; $R_2$ is a divalent or multivalent organic group having 2 to 40 carbon atoms; and n is at least 2.

Embodiment 23. The chain transfer agent as in any prior embodiment, wherein each occurrence of $R_1$ is independently a $C_{1-10}$ alkylene, a $C_{6-12}$ arylene, or a combination thereof; and $R_2$ is a substituted or unsubstituted $C_{2-30}$ alkyl, $C_{3-30}$ cycloalkyl, $C_{2-30}$ heteroalkyl, $C_{3-30}$ heterocycloalkyl, or a combination comprising at least one of the foregoing.

Embodiment 24. The chain transfer agent as in any prior embodiment, wherein $R_2$ has one or more hydroxyl substituents.

Embodiment 25. The chain transfer agent as in any prior embodiment, wherein the chain transfer agent is a reaction product of sorbitol and thioglycolic acid or a reaction product of sorbitol, thioglycolic acid, and citric acid, or a combination thereof.

As used herein, the term "alkyl" refers to a straight or branched chain, saturated hydrocarbon group regardless whether straight or branched chain is specifically mentioned or not. "Cycloalkyl" refers to a non-aromatic monocyclic or multicylic hydrocarbon group having at least three carbon atoms with cyclohexyl and cyclopentyl being exemplary cycloalkyl group. "Aryl" refers to an aromatic group containing only carbon in the aromatic ring or rings with phenyl being an exemplary aryl group. A "heteroalkyl" group is an alkyl group that comprises at least one heteroatom covalently bonded to one or more carbon atoms of the alkyl group. Each heteroatom is independently chosen from nitrogen (N), oxygen (O), sulfur (S), and phosphorus (P). "Heterocycloalkyl" refers to a non-aromatic monocyclic or multicylic group having at least three carbon atoms and at least one heteroatom such as N, O, or S.

Unless otherwise indicated, each of the foregoing groups for $R_1$ and $R_2$ can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. Exemplary groups that can be present on a "substituted" position include, but are not limited to, a halogen, a group having an N, S, O, or F atom, alkyl, cycloalkyl, alkenyl, or alkynyl.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. An N-vinyl amide polymer which is a reaction product of:
a monomer component comprising an N-vinyl amide; and
a chain transfer agent of Formula (I):

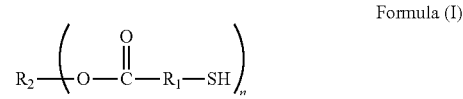

Formula (I)

wherein
each occurrence of $R_1$ is independently a $C_{1-20}$ alkylene, a $C_{1-20}$ heteroalkylene, a $C_{3-20}$ cycloalkylene, a $C_{3-20}$ heterocycloalkylene, a $C_{6-20}$ arylene, or a combination thereof, and $R_1$ is substituted or unsubstituted;
$R_2$ is a multivalent organic group having 2 to 40 carbon atoms; and
n is at least 2.

2. The N-vinyl amide polymer of claim 1, wherein each occurrence of $R_1$ is independently a $C_{1-10}$ alkylene, a $C_{6-12}$ arylene, or a combination thereof.

3. The N-vinyl amide polymer of claim 1, wherein $R_2$ is a substituted or unsubstituted $C_{2-30}$ alkyl, $C_{3-30}$ cycloalkyl, $C_{2-30}$ heteroalkyl, $C_{3-30}$ heterocycloalkyl, or a combination comprising at least one of the foregoing.

4. The N-vinyl amide polymer of claim 1, wherein $R_2$ has one or more hydroxyl substituents.

5. The N-vinyl amide polymer of claim 1, wherein the N-vinyl amide is of Formula (II) or Formula (III)

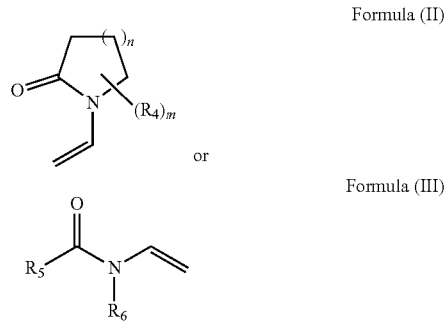

Formula (II)

or

Formula (III)

wherein
each $R_4$ is independently a halogen atom or a $C_{1-10}$ alkyl,
each of $R_5$ and $R_6$ is independently hydrogen or a $C_{1-10}$ alkyl,
n is 1 to 5, and
m is 2+n.

6. The N-vinyl amide polymer of claim 5, wherein the N-vinyl amide is of Formula (II), m is 0, and n is 1 to 2.

7. The N-vinyl amide polymer of claim 1, wherein the monomer component further comprises at least one of an acrylate or an acrylamide.

8. The N-vinyl amide polymer of claim 1, wherein the N-vinyl amide polymer is a reaction product of the monomer component, the chain transfer agent, and a crosslinking agent.

9. The N-vinyl amide polymer of claim 8, wherein the crosslinking agent comprises glycerol dimethacrylate, ethylene glycol dimethacrylate, di(ethylene glycol) dimethacrylate, triethylene glycol dimethacrylate, tetraethylene glycol dimethacrylate, poly(ethylene glycol) dimethacrylate, 1,3-butanediol dimethacrylate, 1,4-butanediol dimethacrylate, glycerol 1,3-diglycerolate diacrylate, ethylene glycol diacrylate, di(ethylene glycol) diacrylate, tri(ethyleneglycol) diacrylate, tetra(ethylene glycol) diacrylate, poly(ethylene glycol) diacrylate, or 1,4-butanediol diacrylate, or a combination comprising at least one of the foregoing.

10. The N-vinyl amide polymer of claim 8, wherein the monomer component comprises 1-vinyl-2-pyrrolidinone and at least one of N-vinylcaprolactam and butyl acrylate.

11. A hydrate inhibitor composition comprising the N-vinyl amide polymer of claim 1.

12. The hydrate inhibitor composition of claim 11, further comprising a solvent.

13. The hydrate inhibitor composition of claim 12, wherein the solvent comprises methanol, ethanol, propanol, butanol, ethylene glycol, 1,2-propylene glycol, 1,3-propylene glycol, glycerin, diethylene glycol monoethyl ether, ethoxylated propylene glycols, ethylene glycol monobutyl ether, 2-ethoxyethanol, 2-propoxyethanol, 2-isopropoxyethanol, 2-butoxyethanol, 2-isobutoxyethanol, 2-methoxyethanol, a ketone, or a combination comprising at least one of the foregoing.

14. The hydrate inhibitor composition of claim 11, wherein the N-vinyl amide polymer is present in an amount of about 5 to about 50 wt % based on the total weight of the hydrate inhibitor composition.

15. A method of controlling hydrate formation in a fluid comprising water and a hydrate-forming guest molecule, the method comprising contacting the fluid with an inhibitor composition comprising the polymer of claim 1.

16. The method of claim 15, wherein the hydrate-forming guest molecule comprises methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, and xenon, or a combination comprising at least one of the foregoing.

17. The N-vinyl amide polymer of claim 1, wherein in Formula (I), each occurrence of $R_1$ is independently —$CH_2$—, —$CH(CH_3)$—, —$CH(C_2H_5)$—, —$C(CH_3)_2$—, —$CH_2CH_2$—, —$CH(CH_3)CH_2$—, —$CH_2CH(NH_2)$—, —$CH_2CH(COOH)$—, —$CH_2CH_2CH_2$—, or —$C_6H_5CH_2$—.

18. The N-vinyl amide polymer of claim 1, wherein $R_2$ is a $C_{2-40}$ alkyl, a $C_{2-40}$ heteroalkyl, a $C_{3-40}$ cycloalkyl, a $C_{3-40}$ heterocycloalkyl, a $C_{6-40}$ aryl, or a combination thereof.

19. The N-vinyl amide polymer of claim 1, wherein $R_2$ is substituted with one or more hydroxyl groups.

20. The N-vinyl amide polymer of claim 1, wherein $R_2$ contains up to 10 ether bonds.

* * * * *